United States Patent [19]
Buzzetti

[11] Patent Number: 5,319,734
[45] Date of Patent: Jun. 7, 1994

[54] FIBER OPTIC ATTENUATOR

[75] Inventor: Mike F. Buzzetti, Santa Clarita, Calif.

[73] Assignee: California Institute of Technology, Pasadena, Calif.

[21] Appl. No.: 119,018

[22] Filed: Jul. 19, 1993

[51] Int. Cl.$^5$ .............................................. G02B 6/36
[52] U.S. Cl. .................... 385/140; 385/134; 385/147
[58] Field of Search .................. 385/62, 66, 69, 84, 385/81, 86, 87, 140, 134, 135, 136, 137, 147

[56] References Cited

U.S. PATENT DOCUMENTS

| | | | |
|---|---|---|---|
| H595 | 3/1989 | Lafaw | 385/69 |
| 4,878,730 | 11/1989 | Wall | 385/140 |
| 4,958,903 | 9/1990 | Cobb et al. | 385/135 |
| 5,189,724 | 2/1993 | Hartley | 385/135 |

Primary Examiner—Rodney B. Bovernick
Assistant Examiner—John Ngo
Attorney, Agent, or Firm—Robert M. Wallace; Michael L. Keller

[57] ABSTRACT

A fiber optic attenuator of the invention is a mandrel structure through which a bundle of optical fibers is wrapped around in a complete circle. The mandrel structure includes a flexible cylindrical sheath through which the bundle passes. A set screw on the mandrel structure impacts one side of the sheath against two posts on the opposite side of the sheath. By rotating the screw, the sheath is deformed to extend partially between the two posts, bending the fiber optic bundle to a small radius controlled by rotating the set screw. Bending the fiber optic bundle to a small radius causes light in each optical fiber to be lost in the cladding, the amount depending upon the radius about which the bundle is bent.

3 Claims, 1 Drawing Sheet

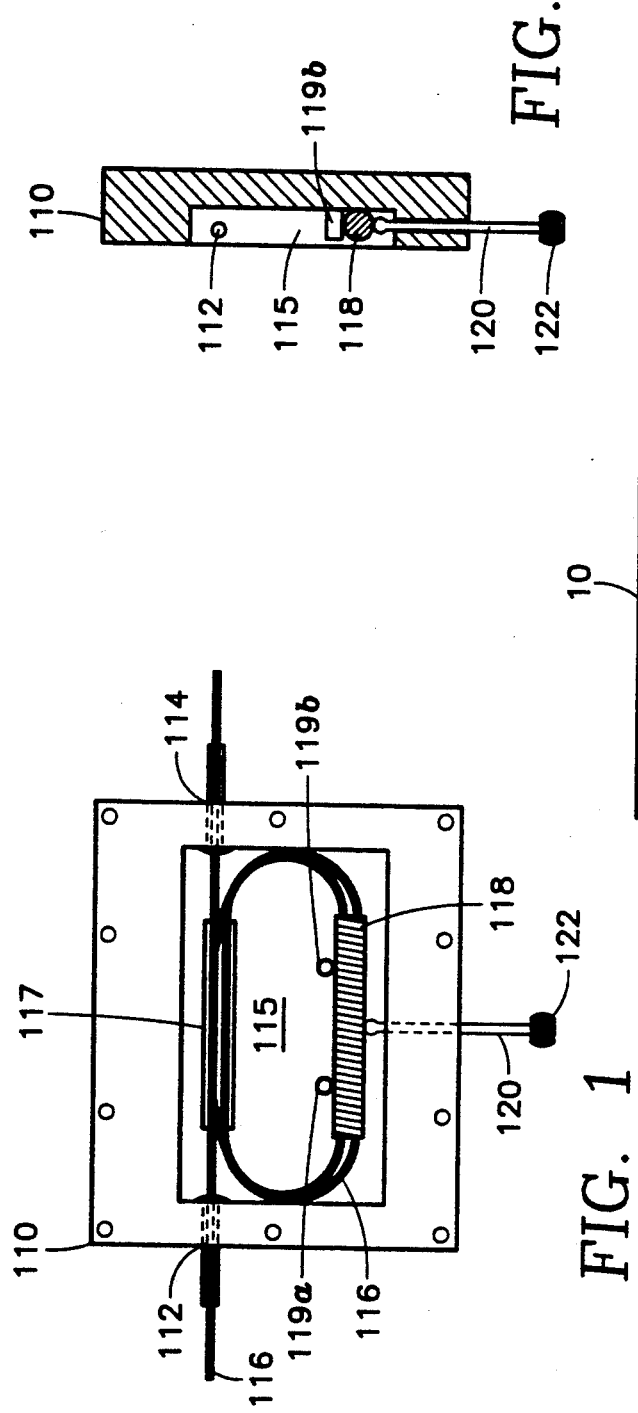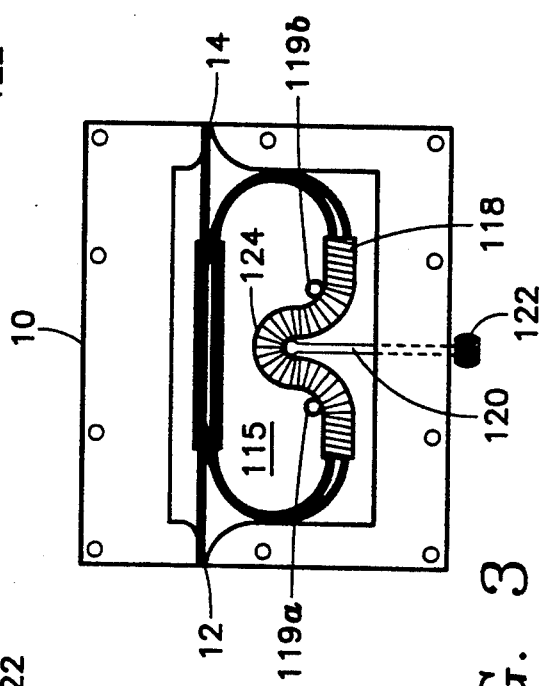

FIBER OPTIC ATTENUATOR

BACKGROUND OF THE INVENTION

1. Origin of the Invention

The invention described herein was made in the performance of work under a NASA contract, and is subject to the provisions of Public Law 96-517 (35 USC202) in which the Contractor has elected to retain title.

2. Technical Field

The invention is related to a mechanically actuated fiber optic attenuator.

3. Background Art

Fiber optic attenuators are required in cable television, communication networks such as fiber optic telephone networks and the like, to attenuate light transmitted through fiber optic bundles at selected locations. Conventional fiber optic attenuators typically exhibit high back reflection, temperature instability and vibration sensitivity. There is a need for a fiber optic attenuator having no back reflection, no insertion loss, no Fabry-Perot effect, low vibration sensitivity and which has temperature stability.

These and other objects and advantages of the invention will become apparent in the following detailed description when taken in conjunction with the accompanying drawings.

SUMMARY OF THE DISCLOSURE

The invention is a mandrel structure through which a bundle of optical fibers is wrapped around in a complete circle. The mandrel structure includes a flexible cylindrical sheath through which the bundle passes. A set screw on the mandrel structure impacts one side of the sheath against two posts on the opposite side of the sheath. By rotating the screw, the sheath is deformed to extend partially between the two posts, bending the fiber optic bundle to a small radius controlled by rotating the set screw. Bending the fiber optic bundle to a small radius causes light in each optical fiber to be lost in the cladding, the amount depending upon the radius about which the bundle is bent.

The advantage of the fiber optic attenuator of the invention is that it has no back reflection, no insertion loss, no Fabry-Perot effect, low vibration sensitivity and good temperature stability, simplicity, rugged construction and requires to interfaces or interruptions of the optical fibers in the bundle.

DESCRIPTION OF THE DRAWINGS

FIG. 1 is a top view of a fiber optic attenuator embodying the invention with no bending of the fiber optic bundle.

FIG. 2 is a side view of the fiber optic attenuator of FIG. 1.

FIG. 3 a view corresponding to FIG. 1 but showing the bending of the fiber optic bundle for optical attenuation.

DETAILED DESCRIPTION OF THE PREFERRED EMBODIMENTS

Referring to FIGS. 1 and 2, a rigid plate 110 has a pair of holes 112, 114 extending into a rectangular space or depression 115 in the major front surface of the plate 110. A fiber optic bundle 116 passes through the holes 112, 114. The bundle 116 is wrapped as many as ten times around the periphery of the depression 115 through a bundle holder 117 at the top of the depression 115 and an elastically deformable sheath 118 at the bottom of the depression 115 backed by a pair of posts 119a, 119b fastened to the floor of the depression or space 115 and extending into the depression 115. A set screw 120 having a finger knob 122 is threadably engaged and extends through an internally threaded hole in the frame 110 into the depression 115 so as to abut the elastically deformable sheath. When the set screw 120 is rotated so as to drive the sheath 118 against the posts 119a, 119b, an intermediate portion of the sheath 118 is forced to extend therebetween as illustrated in FIG. 3. This bends the fiber optic bundle 116 at its portion between the two posts 119a, 119b to a sufficiently small radius to cause light therein to be lost in the cladding thereof.

While the invention has been described in detail by specific reference to preferred embodiments thereof, it is understood that variations and modifications thereof may be made without departing from the true spirit and scope of the invention.

What is claimed is:

1. A fiber optic attenuator comprising:
   a rigid plate having a depressed open space in a major surface thereof;
   a pair of coaxial holes extending through said plate parallel to said major surface on opposite sides of said depressed open space and into said open space;
   an elastically deformable sheath in said open space and a pair of posts fastened to a floor of said open space and backing said deformable sheath;
   a set screw extending through said plate in a direction parallel to said major surface having an outer end with a finger knob and an inner end abutting said sheath.

2. The fiber optic attenuator of claim 1 further comprising a fiber optic bundle of plural windings wrapped around the interior of said open space and through said deformable sheath, the ends thereof extending through said pair of holes.

3. The fiber optic attenuator of claim 2 wherein said set screw pushes said deformable sheath so as to bend said fiber optic bundle between said pair of posts about a sufficiently small radius to attenuate light passing through said fiber optic bundle.

* * * * *